Jan. 3, 1939.  A. C. LINDGREN ET AL  2,142,587
HARVESTER-THRESHER
Filed July 6, 1936  9 Sheets-Sheet 1
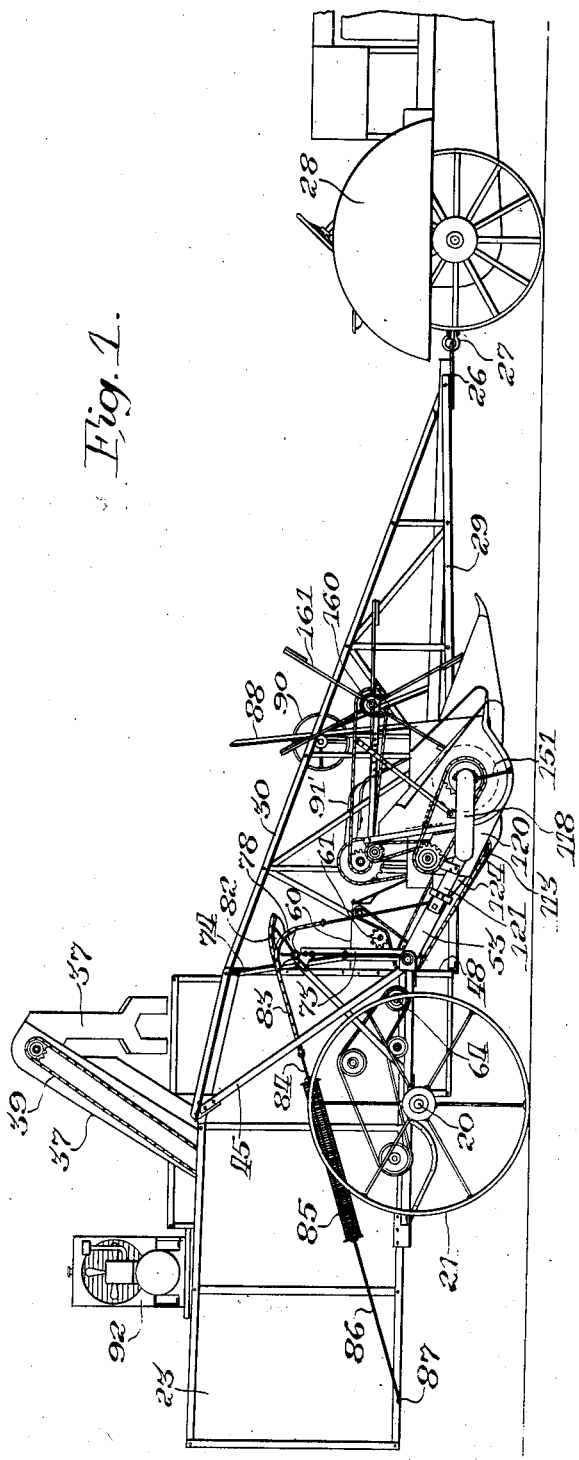

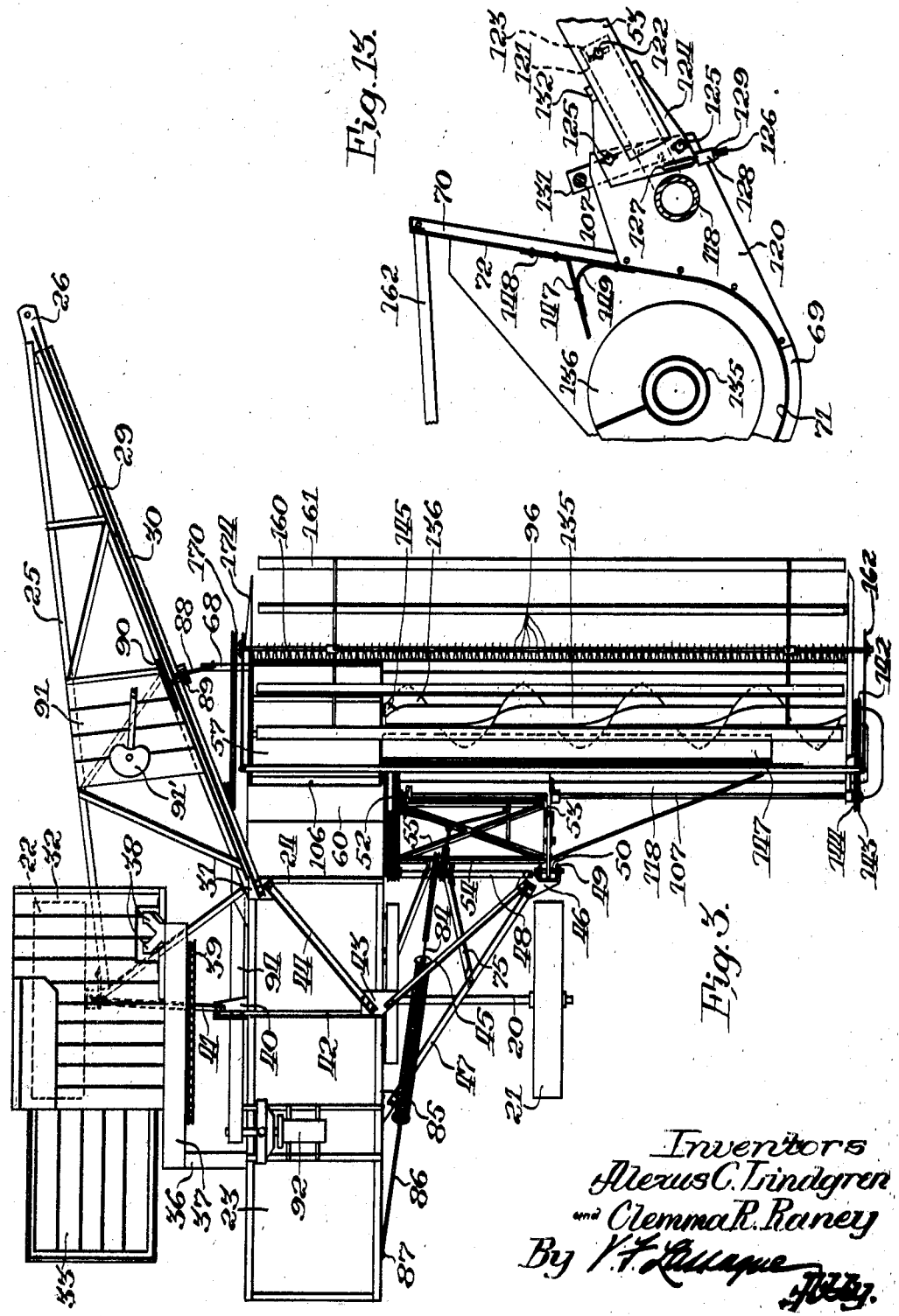

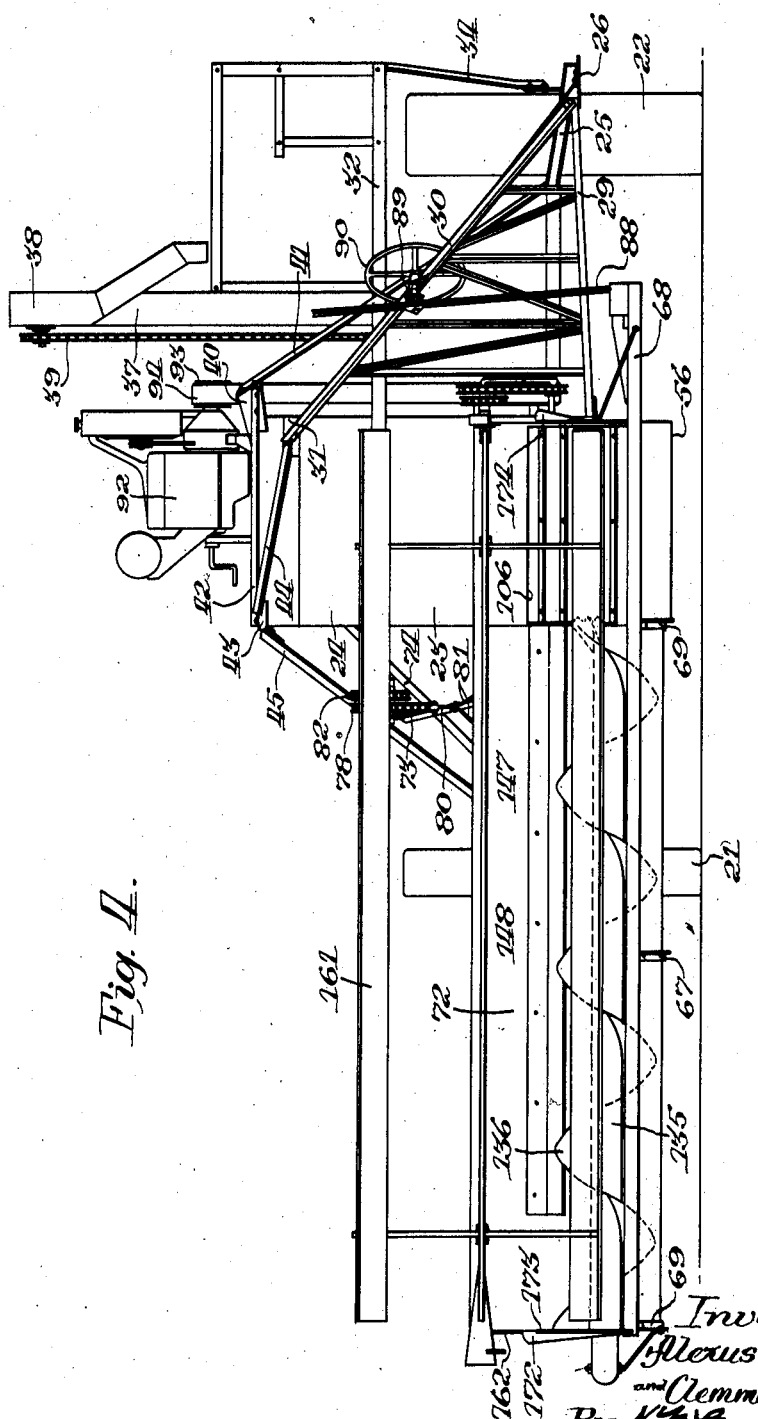

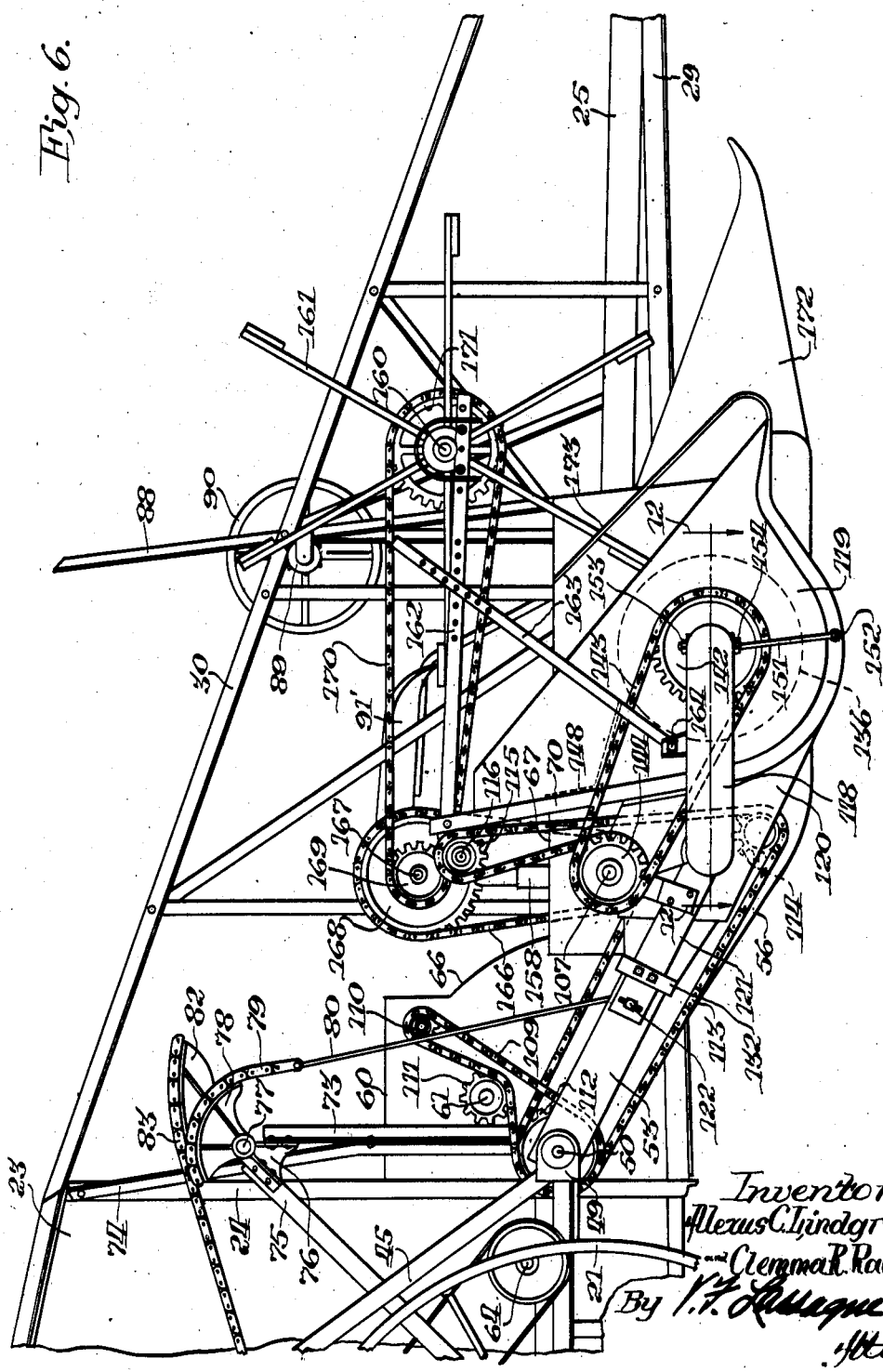

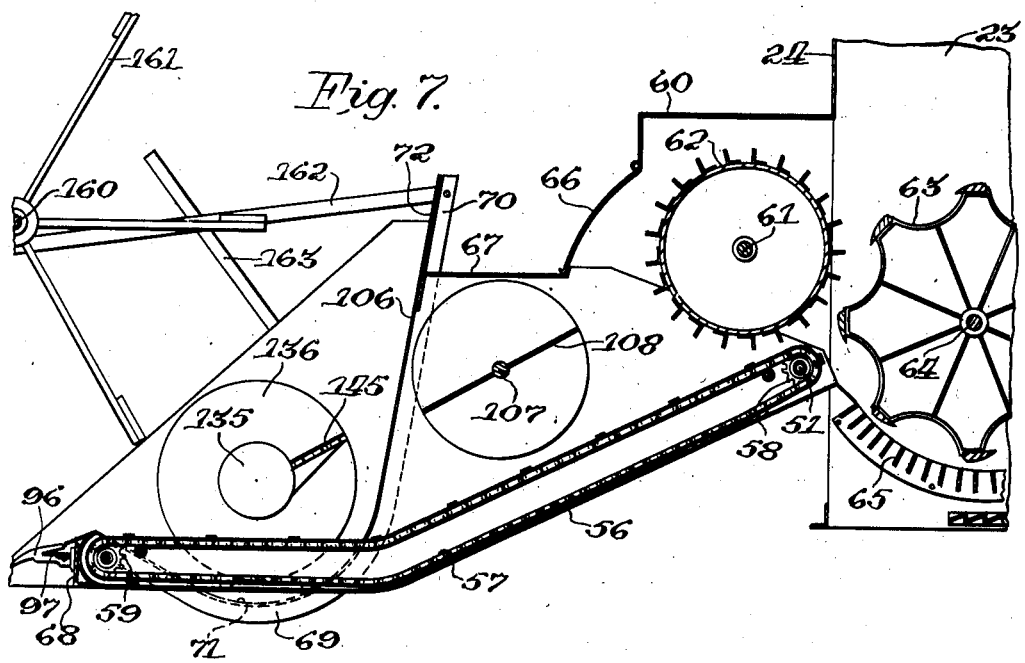

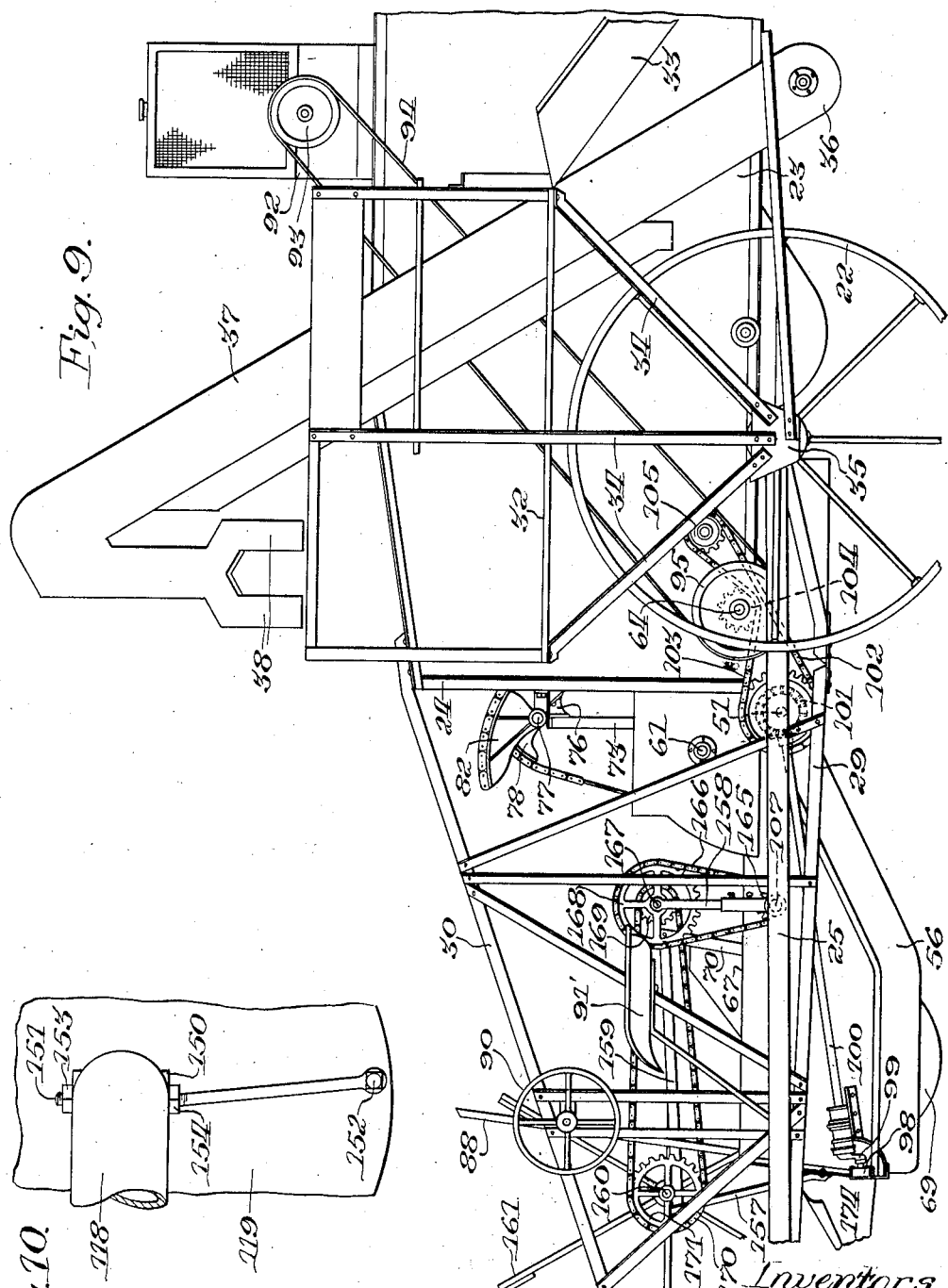

Inventors
Alexus C. Lindgren
and Clemma R. Raney
By V. F. Lavagne
Atty

Inventors
Alexus C. Lindgren
and Clemma R. Raney

Patented Jan. 3, 1939

2,142,587

UNITED STATES PATENT OFFICE 2,142,587

HARVESTER-THRESHER

Alexus C. Lindgren, Chicago, and Clemma R. Raney, Riverside, Ill., assignors to International Harvester Company, a corporation of New Jersey Application July 6, 1936, Serial No. 89,071

49 Claims. (Cl. 56—123)

The invention relates to a harvester thresher.

Where these machines are of ample size and capacity to harvest a relatively wide cut of standing grain, the machines in the past have been unduly heavy and cumbersome to handle. The excessive weight is disadvantageous from the cost standpoint in that it makes the machine relatively expensive and, from the standpoint of draft, it is found that a relatively large size tractor is required to pull the machine through the field.

It is highly desirable to reduce the weight of these harvester threshers, so as to make them available to the farmer at lower cost, and also to simplify the draft problem, so that a tractor may more readily pull the machine through the field, and generally to enhance maneuverability of the outfit in the field.

Attempts have been made to create these so-called light weight harvester threshers and, in that connection, it has been proposed, among other things, to substitute an auger conveyer on the transverse harvester platform for an apron type of conveyer to move the cut grain in a stubbleward direction along the transverse platform to a longitudinally disposed feeder space at the discharge end of the platform. This feeder space may include a conveyer that serves to move the cut grain longitudinally rearwardly into a threshing cylinder for threshing the material. Where such auger conveyers have been used in the past, the usual practice has been to extend the auger carrying shaft transversely across the front end of the feeder space from whence the grain is moved into a threshing cylinder. This required a support for the stubbleward end of the auger shaft and also called for structure operable with the auger to whip the material back from the delivery end of the auger through the feeder space. In other words, the grain at the meeting end of the platform and feeder is required to make a right angle turn and, since at this point the volume of material handled is the heaviest, a real problem is encountered in practice in preventing choking and making for a uniform and even transfer of material from the auger conveyer into the feeder space, or onto the feeder therein, that leads the grain into the threshing cylinder.

It is a well known fact in threshing that the best efficiency of the threshing cylinder is had when the grain is moved thereto in as even and as uniform a stream as possible.

However, with the auger carrying shaft continued across the front end of the feeder, it is found that the shaft itself constitutes an obstruction which serves to choke this corner space where the grain must make a right angle turn in passing from the platform auger conveyer onto the feeder conveyer. Consequently, a large volume of material is apt to become badly tangled and whipped around by the auger, thus interfering and, in fact, making impossible the desired even and uniform feed of the grain to the threshing cylinder.

The invention, therefore, more particularly relates to an improved light weight harvester thresher having a transverse platform, carrying an auger conveyer for moving the material to a longitudinal, rearwardly extending feeder conveyer for the thresher, said two conveyers meeting at a right angle. In constructing this light weight harvester thresher it has been found desirable to carry the sprung weight of the harvester platform from the front end of the longitudinal thresher body in a different manner. In the past, the practice has been to suspend the platform on line levers or the like, which pivotally connect with the transverse axle at the rear of the platform, which axle carries the thresher body and includes the wheel supports on which the machine is transported. By means of the present improved structure the mounting of the platform is not on the axle directly, but rather it is carried from the front end of the thresher body in a novel manner, as will later be described, and all to the end that as light a machine as possible may be provided.

The main object of the invention, therefore, is to provide an improved and novel arrangement of the conveyer auger on the harvester platform and to support the same in an effective manner with the discharge end thereof terminating adjacent the proximate edge of the right-angularly disposed feeder space or feeder conveyer for the thresher, so that the auger or its shaft will not extend over said feeding conveyer, and by this means providing an unobstructed space so that material leaving the discharge end of the auger, where its volume is heaviest, can make a free and unobstructed right-angle turn onto the feeder conveyer to insure an even and uniform feed of the cut grain to the thresher cylinder.

Another object of the invention is to provide in an auger type of harvester thresher, a platform construction including the auger and the feeder with the length of the sickle or width of cut for the harvester part substantially equal to the length of the auger and the width of the feeder at the end thereof, so that in effect the sickle runs across the full length of the combined distance equalling the length of the auger and the width of the feeder.

Another object is to provide an improved means for supporting an auger in a harvester platform in the manner stated, so that the discharge or delivery end of the auger is unsupported by any support means located at its discharge or delivery end.

Another object is to provide an auger supporting means for an auger of the type mentioned and in which the sole supporting means is located at the grainward end of the platform, or, in other words, supported only at that end of the auger which is remote from its delivery or discharge end.

Another object of the invention is to provide an improved hairpin type of mounting for the auger in a harvester thresher of the type specified, in which the bight of the hairpin is disposed at the grainward end of the platform with one leg of the hairpin lying transversely to the line of draft and above the platform trough of the harvester, while the other leg of the hairpin is disposed rearwardly of the backboard of the trough and appropriately anchored in place, so that the weight of the auger is in effect torsionally sprung, thereby insuring a stable mounting for the auger in such a manner that a special bearing support for the delivery or discharge end of the auger on the platform may be eliminated.

Another object of the invention is to provide means whereby the auger in the conveyer trough of the platform may be adjusted up or down with respect to the bottom of the trough.

Another object is to provide an improved means for driving the auger.

Another object is to provide an improved means for suspending the weight of the entire platform from the thresher body of the harvester thresher.

Another object is to provide an improved drawframe for the harvester thresher to serve in pulling the machine from a tractor or other draft power.

Another object is generally to provide a great many other details and improvements in construction involved in the harvester suspension as well as in the feeder that receives the grain from the platform and moves it into the thresher cylinder, to the end that an improved light weight machine may result.

Another object is to provide an improved relationship between the discharge end of the auger and the proximate adjacent edge of the feeder conveyer, so that improved transfer of the material from the platform to the feeder will result.

Another object is to provide an improved baffle plate on the backboard of the platform above and rearwardly of the auger to insure movement of the cut grain along the auger trough or platform in the direction of the feeder to prevent the grain from being carried around by the auger, said means being so constructed that the heads of the grain cannot be crowded or pinched off accidentally, thereby preventing shelling of grain.

Another object is to provide an improved construction of the delivery end of the platform auger to insure a clean transfer of the grain from the auger trough onto the feeder conveyer.

Another object is to provide means whereby that portion of the harvester platform which projects laterally and in a grainward direction beyond the grainward wheel of the machine may be easily and quickly detached for narrowing the width of the machine when it is desired to transport the same through narrow places.

Another object is to provide an improved counterbalancing mechanism for springing the weight of the platform hung from the forward part of the thresher body, so that up and down adjustment of the platform in cutting different heights of grain may be facilitated.

Other objects will be apparent to those skilled in this art as the disclosure is more fully made.

Briefly, these desirable objects are accomplished in the present illustrative embodiment by the provision of a so-called two wheeled harvester thresher in which there is present a transverse axle carried at each end on a wheel, said axle, substantially midway between the wheels, carrying a rigidly mounted longitudinally disposed thresher body, to the stubbleward side of which and to the axle is connected a forwardly and stubblewardly extending diagonally disposed drawframe converging at its front end to a clevis point for connection to the draw-bar of the tractor, said draw-frame being trussed in a novel manner including a frame piece rigidly secured to the top front and stubbleward corner of the thresher body. Stubblewardly of the thresher body the draw-frame and axle combine to provide a mount for an auxiliary attachment, such as a bagger's platform, or a grain tank.

The front end of the thresher body carries a forwardly and longitudinally disposed feeder housing carrying a feeder conveyer, and to the grainward side of said feeder housing is arranged a transverse harvester platform or trough extending a substantial distance grainwardly beyond the grainward carrying wheel of the machine. The platform and feeder are disposed, where they meet, at right angles, and both comprise a unit which is mounted for simultaneous up and down movement from the front end of the thresher, there being provided a suitable spring suspension counterbalance for springing the weight of these unified harvester and feeder parts to facilitate their up and down adjustment. Across the front end of the feeder and the platform, and running the full length of the combined width of these platform and feeder parts, is a sickle for cutting the grain.

An auger conveyer is supported in the novel manner indicated above, the platform trough with the delivery end of the auger cut off or terminating adjacent the grainward edge of the feeder. Thus, grain cut by the knife in front of the auger passes into the auger and is conveyed along the platform thereby to the feeder, and grain cut along the front end of the feeder, which is open, falls directly onto the feeder and combines with the stream of grain coming from the auger to be delivered into a threshing cylinder disposed at the rear or discharge end of the feeder and at the front end of the thresher part. A general idea has already been given of the problem of making the cut grain pass smoothly around the right-angle turn from the platform onto the feeder, and the special auger mounting means of this invention which solves this problem will be gone into in detail later, since it has already been generally discussed. So much of a description of the organization will suffice for the present, since such structure is illustrated in detail in the accompanying sheets of drawings, wherein:

Figure 1 is a general side elevational view of the improved harvester thresher pulled by a tractor and viewed from the grainward side;

Figure 2 is a general front perspective view of the harvester and feeder to show the unobstructed corner between the discharge end of the auger and the feeder where the cut grain must make a right-angle turn;

Figure 3 is a general plan view of the harvester thresher;

Figure 4 is a general front elevational view of the harvester thresher;

Figure 6 is a general side elevational view of the harvester part on an enlarged scale and looking from the grainward side, as seen for example in Figure 5;

Figure 7 is a longitudinal sectional view taken through the feeder, looking along the line 7—7 of Figure 5 in the direction of the arrows;

Figure 8 is a transverse cross sectional view through the machine, taken along the line 8—8 of Figure 5, looking in the direction of the arrows;

Figure 9 is a general side elevational view on an enlarged scale of the machine, looking from the stubbleward side thereof;

Figure 10 is a detail view showing the adjustment for raising or lowering the auger with relation to the bottom of the platform trough;

Figure 13 is a detail cross sectional view taken substantially along the line 13—13 of Figure 5 and looking in the direction of the arrows;

Figure 5:
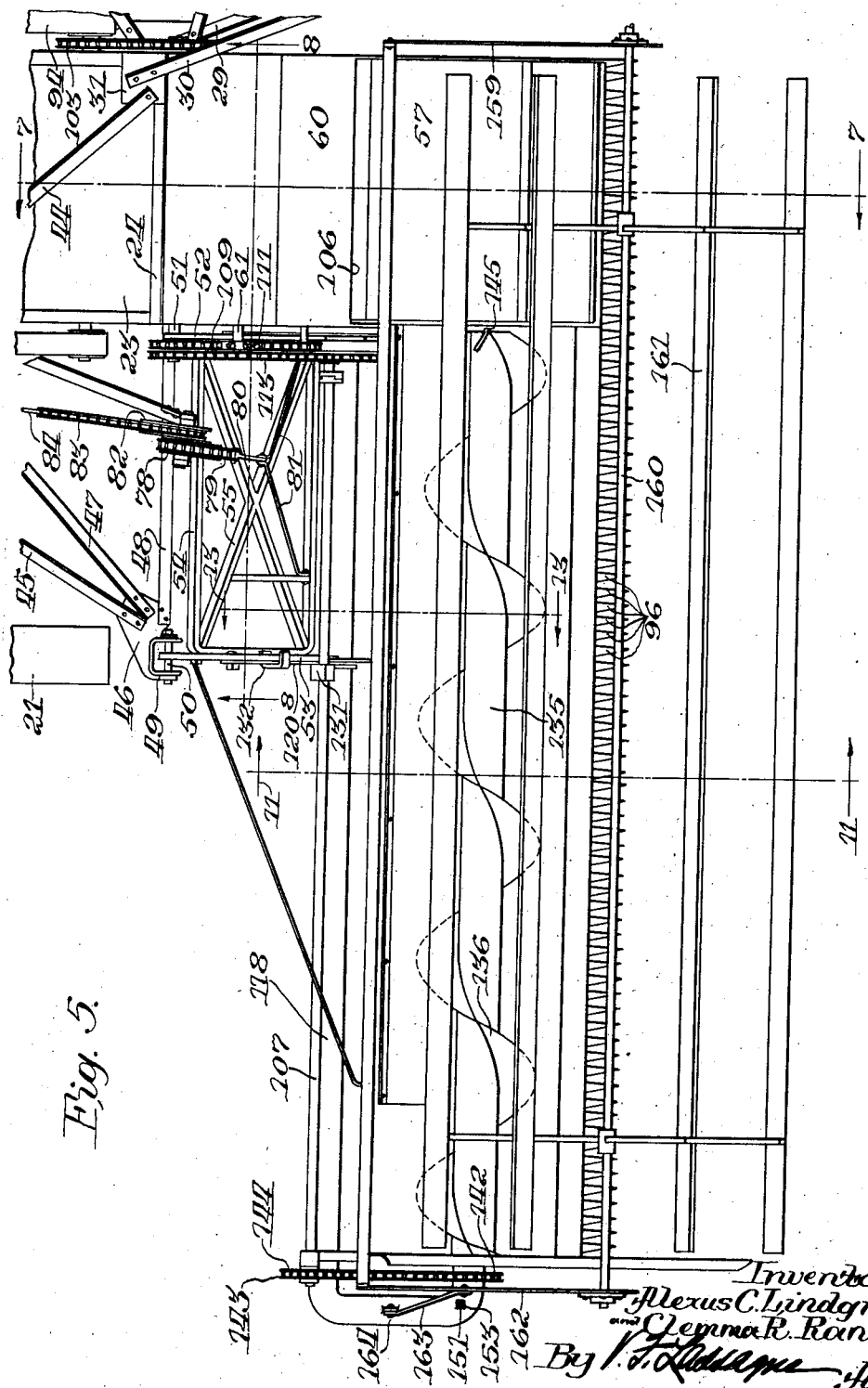
Figure 5 is a general plan view on an enlarged scale to show the harvester part in greater detail and generally its relation to the thresher part.

Looking at Figures 1 and 3, it will be seen that the harvester thresher illustrated in this particular embodiment, by way of example, is of the two wheel type embodying a transverse axle 20 carried on a grain wheel 21 and a main wheel 22 (see also Figure 8). Substantially midway between these two wheels the axle 20 rigidly carries a longitudinally extended thresher body 23, which constitutes the housing for the separating mechanism and which mechanism may be of any standard form insofar as the present invention is concerned. The front end of the thresher housing terminates flush in a vertical plane and is delineated by the front edge 24 thereof. Between the front, stubbleward corner of the housing 23 and the main wheel 22 is disposed a trussed draw-frame primarily constructed of angle bars and embodying a frame element 25, which at its rear end is connected to the axle 20, as shown in Figure 3, and which at its front end is unified with a clevis 26, as shown in Figure 1, adapted to be attached to the draw-bar 27 of a tractor generally shown at 28. This angle bar 25 is substantially horizontally disposed and lies at a level about even with the bottom of the thresher housing 23. A similar angle bar 29 is connected with the clevis 26 and extends rearwardly to be connected in any appropriate manner to the axle 20 and to the under side of the thresher body, the two bars 25 and 29 being angularly related, as shown in Figure 3. Also connected with the clevis 26 is a rearwardly and upwardly extending third angle bar 30 of this draw-frame structure, which, as shown in Figures 1 and 3, is connected to a plate 31 included in the frame structure of the thresher body at the front stubbleward corner of the roof portion thereof. This trussed draw-frame, composed of the three bars 25, 29 and 30, generally lies between the stubbleward side of the thresher body 23 and the main wheel 22, and runs diagonally forwardly and stubblewardly, as shown. This three part trussed draw-frame is suitably cross braced to provide ample rigidity, as shown.

Between the stubbleward side of the thresher body 23 and the main wheel 22, the axle 20 is utilized to carry an appropriate auxiliary, such as the bagger's platform generally indicated at 32, said platform including a bag chute 33. This platform 32 is suitably carried by supports 34 connected to an appropriate bracket 35 carried by the axle 20, as desired.

Out of the stubbleward side of the thresher, at its lower end, extends a conveyer housing 36, which discharges the cleaned grain from the thresher and delivers it into an elevator 37 arranged between the bagger's platform 32 and the stubbleward side of the thresher body 23, said elevator, as indicated in Figures 3, 4 and 9, extending upwardly and terminating in a bifurcated delivery spout 38 of standard construction to make the discharging grain accessible to an operator on the platform 32, who stands there to catch and bag the grain in a manner well understood in this art. It is an interesting thing to note in this connection that the drive chain for the elevator 37 is indicated at 39 and that the same is disposed on the inner or grainward side of the elevator. In other words, the chain 39 is located between the elevator and the adjacent side of the thresher body where it is out of the way and not likely to cause injury to any attendants standing on the platform 32. The chain 39 can be driven from any suitable source of power on the thresher 23, and for that reason this has not been illustrated nor described.

Looking to Figures 3, 5 and 8, it will be seen that the roof of the thresher part 23 carries a bracket 40 for securely anchoring in place a diagonally extending brace 41, that extends stubblewardly and downwardly to take hold of the axle 20 for purposes of general rigidity. At the same time a spanner brace 42 is anchored to the bracket 40 and lies transversely across the roof of the thresher 23 with its other end anchored to a bracket 43 carried on the roof of the thresher at its grainward side. A diagonal tie-bar 44 connects between the plate 31 and the plate 43, as shown, which bar 44 generally is in the direction of strain developed in the draw-frame bar 30. A brace 45 extends diagonally forwardly and grainwardly from the anchor plate 43 to the bracket 46 carried by a frame sill 47, which at its rear end is appropriately connected to the side of the thresher. A transverse saddle frame piece 48 runs underneath the front end of the thresher body 23, as shown in Figure 8, and also connects with the bracket 46. The bracket 46 includes a bifurcated end 49 to carry a transverse pivot pin 50 for a purpose later to appear (see Figure 5). It is to be noted that the pin 50 is located substantially in longitudinal alignment with the wheel 21 and slightly in advance thereof.

At the front end of the thresher housing 23, at the point 24 mentioned as shown in Figures 5, 7 and 8, it will be seen that there is located a transverse shaft 51, which shaft at its grainward end projects out of the housing and provides a pivot in transverse alignment with the pivot pin 50. Pivotally connected at its rear end to this projected end of the shaft 51 is a forwardly extending line lever 52, and similarly carried by the pin 50 is a corresponding line lever 53 arranged in parallelism with the said lever 52. As appears best perhaps in Figure 5, it will be seen that these two line levers 52 and 53 are rigidly joined together with a rectangular frame 54 including an X-brace 55, this structure all being integrally united, preferably as by means of welding, to result in a compact, rigid line lever supporting frame.

The shaft 51 just described serves to carry for up and down pivotal movement a downwardly inclined and forwardly extending feeder housing 56 generally of the same width as the front end of the thresher body 23 and disposed in parallel with and along the stubbleward side of the line lever 52. As shown in Figure 7, this feeder housing has a tight bottom over which is dragged the lower run of a drag-bar type of feeder chain conveyer 57, said chain at its upper end operating around a sprocket wheel 58 on the shaft 51, while the forward loop of said conveyer operates around an idler sprocket and roller shaft 59. The front edge of the thresher housing 23 includes a forwardly extending housing portion 60, in which is disposed a transverse shaft 61 and within said housing extension 60, the shaft 61 carries a beater drum 62 disposed in proximity to the upper end of the feeder drag conveyer 57. The drum 62 and conveyer 57 provide a throat between which the cut grain is fed in an evened, thinned out stream to a threshing cylinder 63, which may be of the rub bar type, as shown in Figure 7, said threshing cylinder being carried on a shaft 64 disposed transversely and journaled in the front end of the housing 23. As shown in Figure 7, this threshing cylinder cooperates with any conventional form of concave 65 to effect threshing of material in a manner well understood in this art.

The front end of the housing extension 60 is closed by a hinged flap door 66, which rides on the roof 67 of the feeder housing 56 when said housing 56 is raised or lowered about the pivot shaft 51 which carries the same.

Along the front edge of the feeder housing 56 is disposed a transverse angle bar 68, which, as shown also in Figure 2, extends grainwardly a substantial distance and beyond the longitudinal line of the grainward wheel 21 for an extent equal to the desired width of the harvester platform to be provided, which is now to be described. At several spaced points along this angle bar 68 are provided frame pieces 69, which are trough or U-shaped at their lower ends and include upwardly extending arm portions 70, the stubbleward one of which is, as shown in Figure 7, being securely and rigidly connected with the feeder housing 56. Carried by these platform frame members 69, grainwardly of the feeder housing 56, is a trough shaped platform 71 which is extended upwardly along the extension 70 to provide a platform backboard or wall 72. The front ends of the line levers 52 and 53 are rigidly connected in any appropriate manner with the back side of this backboard structure 72, so that the line levers in effect carry the harvester platform 71 for up and down pivotal movement about the hinges 50 and 51 and with it as an integral unit, of course, the feeder housing 56, which hinges about the same axis on the shaft 51. There is thus provided a unitary feeder and platform in which these two parts do not have any relative movement with respect to each other, so that both are raised and lowered as a unit.

This great weight, of course, must be counterbalanced in suspending the same to hold it off the ground when desired, and, accordingly, as shown in Figures 5 and 6, an upright standard 73 is carried on the trussed bar 48, which standard 73 is cross braced by a diagonal brace 74 hung from the upper end of the frame 24 and tied securely at its lower end to the plate 46. Also, this structure is trussed by a rearwardly and downwardly extending brace 75, these three frame pieces thus providing a tripod truss on which is carried, as shown best in Figure 6, a bracket 76 including a pivot pin 77 carrying a curved, concentric, rockable guide 78 swingable in a vertical plane on a horizontal axis 77 and running in a fore and aft direction. A chain 79 is trained over the guide 78 and has its rear end securely anchored thereto, the chain terminating in a downwardly extending rod 80, which, as best shown in Figure 5, is connected to a bifurcated bail 81, which at spaced apart points is connected to the forward edge of the X-frame bail 54. Going back to Figure 6, it will be seen that the guide 78 includes therewith an integrally formed eccentric guide member 82, at the front end of which is anchored a chain 83, which extends rearwardly, as shown in Figure 1, to anchor a rod 84 connected to a battery of counterbalancing springs 85, which terminate in a rod 86 suitably anchored as at 87 to the rear grainward side of the thresher body 23 (see also Figure 3).

Extending from underneath the feeder housing 56 in a stubbleward direction, as shown, is an extension of the angle bar 68, to the stubbleward end of which is connected a lift rack 88. The upper end of this rack bar 88, as shown in Figure 6, cooperates with a pin wheel 89 operable by a hand wheel 90, which structure 89—90 is carried at any suitable and convenient place on the draw-frame, such, for example, as on the diagonal trussed frame member 30. This wheel 90 is conventionally latched to hold the platform structure in any desired releasably locked position of up or down adjustment. It will be noted that between the frame members 25 and 29 is arranged a deck 91, which serves as an operator's control station where an operator may stand and operate the wheel 90 to regulate the height of cut of the platform by raising and lowering the rack bar 88 with the counterbalancing spring structure just described making such adjustments easy in a manner well understood in this art. A seat 91' may be provided on this deck 91 for the convenience of the attendant.

A motor 92 is arranged transversely on the roof of the thresher body 23 in the position shown in Figure 1. As appears in Figure 9, it will be seen that the engine shaft carries a pulley 93 on the stubbleward side of the body 23, said pulley serving to drive a belt 94, which extends downwardly and forwardly alongside of the thresher body, to drive a pulley 95 on the thresher cylinder shaft 64 heretofore described, and in this fashion power is derived for driving the threshing cylinder 63 heretofore described.

The angle bar 68 carries the usual guard fingers 96 with which cooperates a conventional reciprocating knife 97 for cutting the crop. This knife 97 is driven, as indicated in Figure 9, from a suitable type of knife head and pitman 98 operated by a crank 99 driven from a shaft 100, which extends longitudinally and rearwardly up alongside the feeder housing 56 along its stubbleward side with the rear end of the shaft 100 being driven by a bevel gear set 101 shown in said Figure 9, said bevel gear set 101 deriving power from the shaft 51 heretofore described, and which carries a sprocket wheel 102 driven by a sprocket chain 103 deriving power from a sprocket wheel 104 on the cylindrical shaft 64 adjacent the pulley 95 thereon, said chain 103 further being trained around an idler sprocket wheel 105, as shown.

The backboard 72 in line with the feeder, as indicated in Figures 2 and 7, is open, as at 106, so that the cut material can be moved back by the conveyer 57 into the feeder housing 56 under the roof part 67 heretofore described. A transverse shaft 107 is carried in the feeder housing just to the rear of this opening 106 and within the housing said shaft carries a two paddle type of beater 108 for beating the material back onto the upwardly inclined portion of the feeder conveyer, so that it may be taken by the cylinder type beater 62 heretofore described, and thence delivered to the threshing cylinder 63.

It will be remembered that the drive to the shaft 51 from the engine 92 has already been described. From the shaft 64 power was delivered by a chain 103 to drive the shaft 51. This shaft 51 extends transversely and projects out of the grainward side of the rear end of the feeder housing 56. As shown in Figures 5 and 6, said shaft 51 carries a sprocket wheel for driving a sprocket chain 109, which is wrapped around an idler sprocket wheel 110 and also around a drive sprocket wheel 111 on the shaft 61, thereby to drive the beater drum 62. Adjacent the sprocket wheel on the shaft 51, which drives the chain 109, is another sprocket wheel 112, which drives a chain 113, said chain 113 being wrapped around an idler sprocket wheel 114 on the grainward side of the feeder housing 56, said chain then extending upwardly around an idler sprocket wheel 115 carried on a transverse shaft 116 suitably mounted on a bracket adjacent the upper end of the stubbleward backboard frame bar 70. Said chain 113 is then backwrapped around a sprocket wheel disposed on the shaft 107 adjacent the grainward side of the feeder housing 56, thereby to drive said shaft 107 and the beater 108 disposed thereon within the feeder housing.

Figure 11:
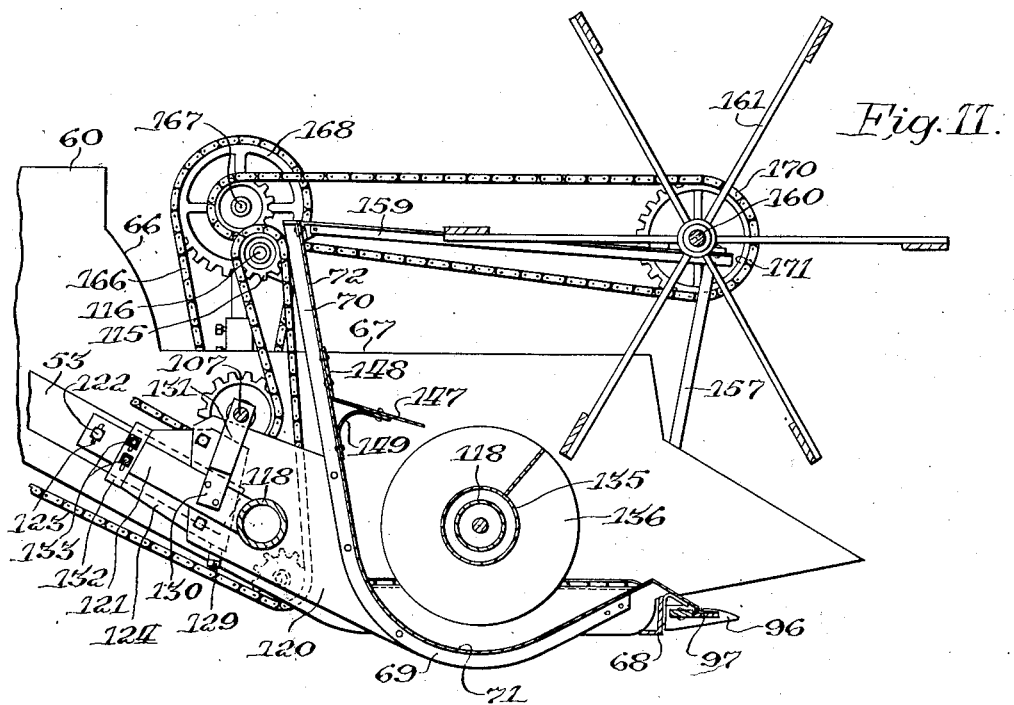
Figure 11 is a general cross sectional view through the harvester part, taken along the line 11—11 of Figure 5, looking in the direction of the arrows.

The grainward side wall of the housing 56, at a point approximately below the shaft 107, carries a rigidly mounted cylindrical sleeve 117, as shown best in Figure 12, and in this sleeve is fitted one end of the rear leg of a U-shaped pipe 118. The rear leg of this pipe 118 extends transversely behind the backboard 72 to the outer end thereof and then hairpins forwardly, so that the front leg of said pipe extends through an end opening in an end wall 119 at the grainward end of the platform 71. The rear leg of said pipe is additionally supported, as shown in Figure 11, by the rearwardly extending plate 120 securely connected to one of the backboard braces 70, it being understood that in the assembly the rear leg of the hairpin pipe 118 passes loosely through said plate 120. Approximately at the point where the rear leg of the U-shaped pipe 118 passes through the plate 120 the same has securely formed therewith, as by welding, a rearwardly extending arm 121, the rear end of which is connected by a bolt 122 to the line lever 53, said arm 121 including a slot 123, so that adjustments of the arm 121 may be made by loosening and tightening the bolt 122.

By means of this adjustment the pipe 118 may be sprung up or down for taking the sag out of it, in case any develops therein. As shown in detail in Figure 13, the forward end of the line lever 53 is welded to the plate 124, which has a bolt connection 125 including slots, as shown, with the rear end of the plate 120. Further, the plate 124 carries a bolt 126, the upper end of which, as at 127, is welded to the plate 124. The proximate point of the plate 120 has welded to it a sleeve 128, said bolt carrying a nut 129, whereby, when the nut 129 is turned by means of a wrench on the threaded shank 126, the plate 124 may be sprung with relation to the plate 120 for springing the platform 71 to level the same in the event that it should develop any sag. The arm 121 carries an upstanding arm 130 including at its upper end a wooden block 131 serving as a journal bearing support for the shaft 107, which incidentally is extended in a grainward direction from the feeder housing the full width of the platform, the same running behind the backboard 72. The arm 121 includes the U-shaped clip 132 mounted on the said arm by means of clamp bolts 133 carried in slots, so that the U-shaped clip 132 may be positioned up or down on said arm 121, said U-shaped clip serving to embrace the upper and lower edges of the line bar 53 for a purpose later to appear.

The front leg of the U-shaped pipe 118 is mounted in a bearing carrier sleeve 134, which projects through the end wall 119 of the platform 71. Inwardly of the wall 119 there is secured to this bearing carrier 134 a hollow shaft 135 of a screw conveyer 136. The outer end of the front leg of the pipe 118 carries rigidly therein a plate 137 carrying a fixed shaft 118' on which is mounted an outer bearing carrier 138 for supporting the outer end of the auger shaft 135. The outer end of the auger shaft has fixed therein by welding a sleeve 139 turning therewith and which is locked by a pin 140 within a groove 141 in the end of the shaft 118, so as to hold the auger shaft 135 against endwise displacement on the forward leg of the U-shaped pipe 118.

Going back to the first bearing carrier sleeve 134, it will be noted that it includes a sprocket wheel 142 located grainwardly outwardly of the platform wall 119 and inside the bight of the U-pipe 118, a chain 143 serving to drive the sprocket 142 and the auger shaft 135 from a sprocket wheel 144 mounted at the grainward end of shaft 107.

It is of the greatest importance to note that the stubbleward end or discharge end of the auger 136, as best appears in Figure 2, stops just short of the grainward edge of the longitudinal feeder conveyer 57. It is also of importance to note that the bottom 71, or auger trough platform, is disposed, as well indicated in Figure 7, a substantial distance below the bottom of the top run of the feeder conveyer 57. Thus, a pocket in effect is formed where the end of the auger trough is disposed adjacent the feeder conveyer, and, to insure that this pocket will be thoroughly and continually swept clean of any cut grain that may tend to accumulate there, the auger is modified so that the end flight thereof along its pitch line is provided with a radially disposed, serrated raking element 145. This serrated wiper 145 also serves to stiffen the discharge end of the auger flight to reenforce the same. If desired, an additional rib, such as that indicated at 146 in Figure 2, may be welded at the back side of the flight where it is cut off, for additionally strengthening the same.

It will be noted, therefore, that the knife 97 extends across the full length of the auger 136 and the width of the feeder conveyer 57, and that the auger 136 stops short of the conveyer 57. Where the auger 136 delivers the cut material moved along the platform trough 71 onto the feeder 57, the cut material must make a right hand turn, and the present construction works out very nicely, in that there is no support for the outer or discharge end of the auger 136 that could in any way serve as an encumbrance to the free flow of the cut material in making this right angular turn as it is transferred from the transverse auger onto the longitudinal feeder 57. The discharge end of the auger with the edge of the wiper 145 serves to sweep the material across the bottom of the trough and up the rear side of the backboard 72 to raise the same onto the level of the upper end of the feeder conveyer 57, so that the push of the material is even and continuous in making the right angular turn described. The sole support for the auger 136 is the front leg of the pipe 118 and this in turn is carried torsionally through the bight of the U-shaped pipe 118 and the rear leg thereof which is included in the collar 117 and the plate 120.

To insure proper movement of material along the auger in the direction of the conveyer 57 without being carried around over the auger 136, there is provided on the backboard 72 a forwardly inclined baffle plate 147, which has a rear angle 148 bolted detachably to the backboard 72 at a point rearwardly of the upper edge of the auger 136. A curved piece 149 is arranged between the backboard and the upper side of the baffle 147 to strengthen the support for the baffle and incidentally to round out the corner between the baffle and the backboard, so that no point will be provided where heads of the grain might stick and be prevented from free movement along the trough 71 to the feeder conveyer 57. This baffle 147 is preferably held in place on the backboard 72 by means of cap-screws, so that it may be quickly removed when desired, and it is further to be noted that the baffle plate 147 is of a length substantially shorter than the length of the auger. In other words, the grainward end of the baffle 147 is located a substantial distance in a stubbleward direction away from the grainward end of the auger.

Figure 12:
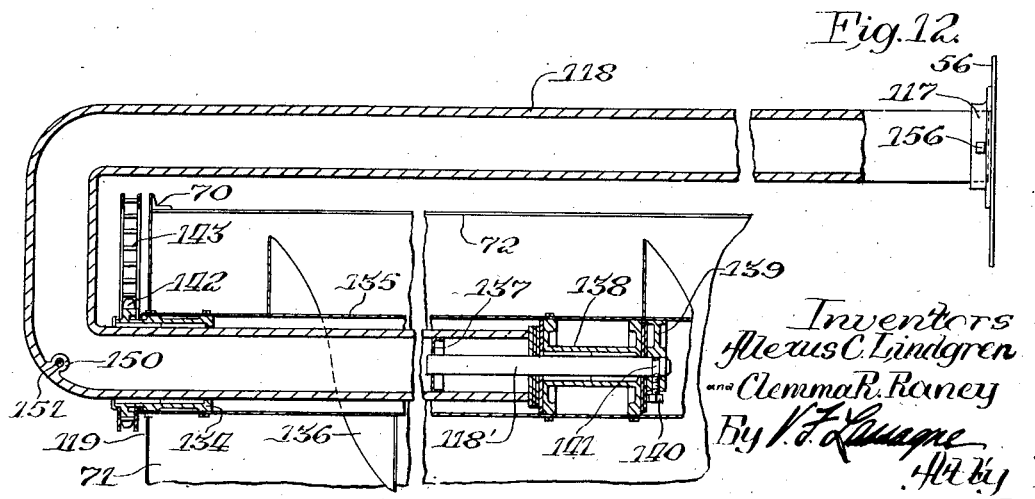
Figure 12 is a detail cross sectional view through the auger support as seen substantially along the line 12—12 of Figure 6, looking in the direction of the arrows.

The outer or bight end of the U-pipe 118 is formed with an apertured boss 150, as shown in Figures 10 and 12, through which is passed a screw threaded rod 151 extending substantially vertically with its lower end connected by a bolt 152 to the lower end of the end wall 119 of the platform. By means of an upper nut 153 and a lower nut 154, the bight portion of the pipe 118 may be sprung slightly up or down properly to position the auger 136 in relation to the trough 71 of the platform. Looking at Figure 2, it will be seen that the platform 71, the backboard 72, as well as the angle bar 68 are split along a line 155, which is substantially in line with the longitudinal line of travel of the grain wheel 21. When it is desired to narrow the harvester thresher for transportation through narrow places, the auger 136 will be first removed from its support 118 and then the entire hairpin structure 118 may be slid out endwise in a grainward direction upon removal of a bolt 156 which connects the rear leg of the pipe 118 to the collar 117. In performing this operation, of course, the baffle 147 must first be removed as well as the reel structure above the platform, which has not yet been described. It is when the outer end of the platform and the hairpin 118 are restored to their normal positions—that is for the full width of the machine—that the U-shaped clip 132 comes into play in properly guiding and bringing the parts back into alignment, so that the arm 121 on the pipe 118 can be made to position properly over the line lever 53. The reel structure for the harvester platform will next be described.

The front stubbleward side of the feeder housing 56 carries an upright support 157, and rearwardly thereof the stubbleward side of the housing 56 carries an upright support 158. Spanning these supports at their upper ends is a longitudinal frame bar 159, as shown best in Figure 9. The forward end of the frame bar 159 has suitably journaled thereon a transverse reel shaft 160 carrying a harvester reel 161 disposed over the cutting apparatus 97. As shown in Figure 6, the grainward backboard bar 70 carries a forwardly extending frame bar 162 suitably supported by a brace 163 connected at 164 to a boss on the bight of the hairpin auger support 118. The forward end of the frame-bar 162 carries a journal for the grainward end of the transverse reel shaft 160. The reel is driven in the following manner.

It will be remembered that the chain 113 is backwrapped around a sprocket wheel on the shaft 107 to drive said shaft 107, delivering power thereto at the grainward side of the housing 56. This shaft 107 extends through the said housing 56, as has been described, and at its stubbleward side it carries and drives a sprocket wheel 165, which in turn drives a chain 166 extending upwardly to drive a shaft 167 carried by the support 158 through the medium of a sprocket wheel 168 on said shaft 167. The shaft 167 also drives a sprocket wheel 169, which drives a chain 170 to drive a sprocket wheel 171 on the reel shaft 160 for driving said shaft and the reel 161 carried thereon.

The grainward end of the platform carries a divider 172 and also a lifter guard 173, as shown in Figure 6. The stubbleward end of the feeder housing 56 is in the correct position in relation to the knife inside the divider 174, as shown in Figure 4.

Figure 14:
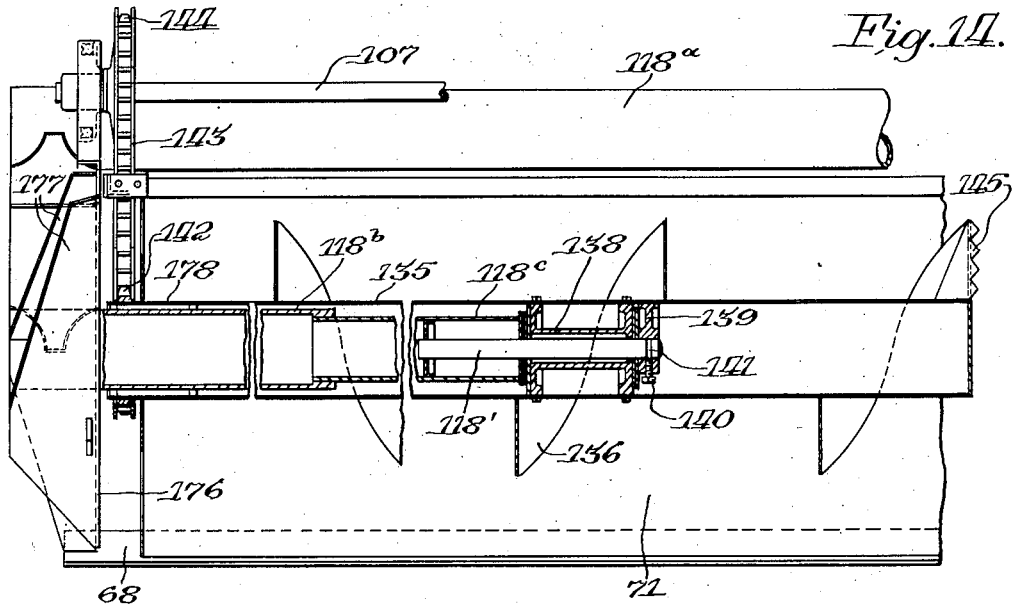
Figure 14 is a detail view similar to Figure 12, but showing a modified form of support for the platform auger; and, Figure 15 is an end elevational view, looking from the grainward end, of the platform structure shown in Figure 14.
Figure 15:
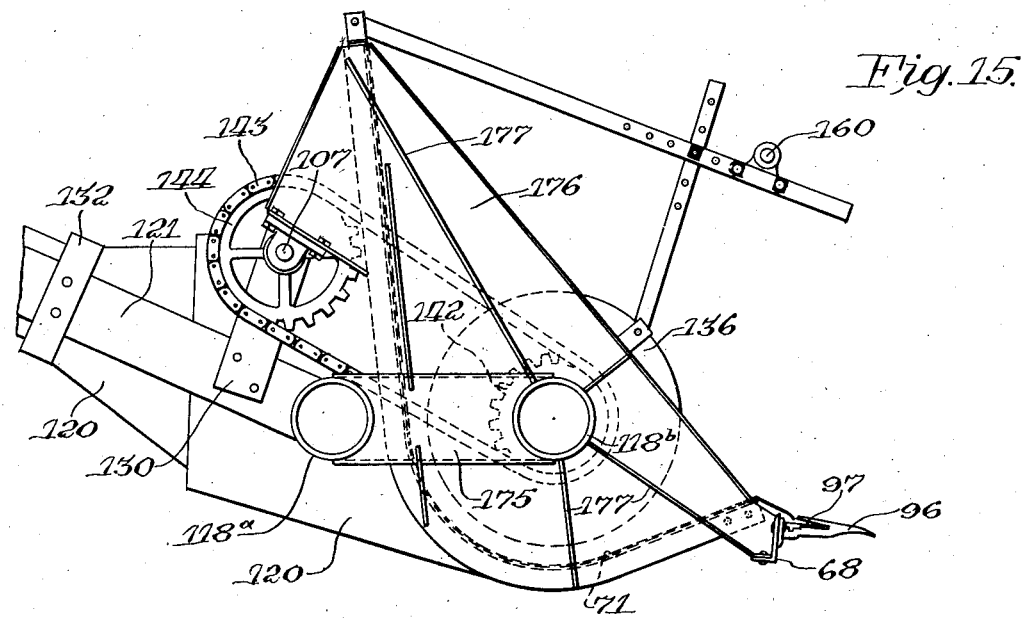

In Figures 14 and 15, the torque pipe hairpin support is shown in modified form, the same in this example not constituting a continuously bent pipe formed as a U or hairpin, but instead the same comprises a rear pipe 118$^a$, which at its stubbleward end carries a right angularly disposed pipe 175. This pipe section 175 extends forwardly to be welded to a front or parallel pipe section 118$^b$, that is passed through an end plate member 176 for closing off the grainward end of the platform 71. This plate 176 is appropriately strengthened by a series of welded, or integrally formed, strengthening baffles 177, some of which, as shown in Figure 15, unify the connector pipe 175 with the plate 176 to result in a very sturdy end support structure for carrying the pipe section 118$^b$. Since it is quite a problem to support the weight of the pipe section 118$^b$ from this outer end plate 176 and the cooperating supporting pipe section 118$^a$, it is desirable to make the pipe section 118$^b$, as it extends out over the trough 71, as light as possible, and to that end, as shown in Figure 14, the pipe is made up of tubular sections of successively smaller diameter, so that the terminal end piece indicated at 118$^c$ is smaller in diameter and, therefore, lighter in weight.

The auger shaft 135 is rollable on a bearing 178, and the sprocket wheel 142 heretofore described, in this instance, is welded directly to the auger shaft 135, the shaft 135 and its auger 136 being driven in the same manner by the chain 143 receiving power from the sprocket wheel 144 on the shaft 107. The opposite end of the shaft 135 is supported by identically the same means and parts shown in Figure 12, and at the end of the auger is disposed the serrated wiping member 145 for cleaning out the pocket formed by the trough, the lower edge of which is depressed below the top of the feeder conveyer 57.

In solving this problem of providing an unobstructed passage for the grain from the discharge end of the auger 136 onto the feeder 57 and in causing the grain to make a smooth rightangle turn at this point where the volume of material delivered by the auger and handled by the conveyer is the heaviest, it will be seen that a real problem has been solved in providing a satisfactory support for carrying the auger conveyer from the grainward end of the platform. In machines constructed in accordance with this invention having a wide cut of grain, such as the present machine which is intended to cut 12 feet, a very sturdy and rigid support at the outer or grainward end of the platform for carrying the auger is necessary, and in this connection in the examples illustrated in Figures 12 and 14 the actual hairpin construction of Figure 12 or the modified parallel pipe construction of Figure 4 solves this supporting problem very nicely. If the width of cut of the machine were to be materially reduced, say to a width of 5 or 6 feet in the instance of the so-called baby combines or harvester threshers, so that the width of the feeder utilizes the major portion of the distance or width of cut, then but a short length auger would be required, say one having a length of approximately 2 or 3 feet. In such instances, the weight of the auger is not great and it would be a relatively simple matter to support it from the grainward end wall of the platform trough without the necessity of using a more involved hairpin or parallel pipe torsion supporting means. In such baby size harvester threshers the auger shaft would be simply supported in the grainward end wall of the platform trough and would also be driven from the other end as in the present disclosure, but the opposite end, which would be the discharge end of the auger, where it delivers the grain onto the feeder conveyer having a top run disposed above the lower peripheral edge of the auger flights, would be unsupported by any bearing support or the like at that end, for, in accordance with the teaching of this invention, it is of the greatest importance that the delivery end of the auger be left free and unencumbered by any projecting shaft or support therefor, so that the grain on the platform can make a smooth uninterrupted turn from the auger into the feeder housing space or onto the conveyer without resulting in bunching and generally uneven feed, which interferes with the efficient operation of the threshing cylinder.

The use and operation of the machine is as follows: The trussed draw-frame 25, 29 and 30, through the clevis 26, is coupled with a suitable source of draft power for pulling the harvester thresher through the field. The motor 92 disposed transversely on the top of the thresher body 23, through the belt 94, drives the cylinder shaft 64 and the threshing cylinder. From this shaft 64, in any conventional manner, various operative mechanisms enclosed within the housing 23 are driven for the purpose of threshing the grain and cleaning the same. Power is also taken from this threshing cylinder shaft 64 in the manner described to drive the sickle and the reel, as well as the auger conveyer and the feeder conveyer, including the auxiliary beater elements 62 and 108. As the machine moves through the field, the grain is cut, and that cut of grain in front of the auger 136 is immediately rolled under the auger to the lower back side of the trough or platform 71 in such a manner that the auger 136 in conjunction with the baffle 147 causes the material to move transversely in a stubbleward direction to the end of the trough pocket adjacent the grainward edge of the feeder conveyer 57. At this point the end of the auger sweeps the material upwardly along the back side 72 of the platform trough to cause it to be lifted and pushed laterally onto the top run of the feeder conveyer 57, which moves the material back substantially horizontally from its front end and then rearwardly and upwardly with the aid of the beaters 108 and 62 for treatment by the cylinder 63 and concave 65. That grain cut by the sickle directly in front of the feeder 57 falls directly back, under the influence of the reel 161, to be delivered along with the grain coming from the auger to the thresher cylinder in an obvious manner.

The present construction is especially advantageous in that the feeder is used for moving back into the thresher cylinder that grain cut directly in advance thereof and by this means the length of the auger conveyer over the platform trough may be materially reduced in length. In fact, it is reduced in an amount equal to the width of the feeder, as will be obvious. Still further, it is very desirable in stopping the discharge end of the feeder short of the proximate edge of the feeder conveyer, and the supporting structure for the auger conveyer, which carries the entire load of the auger from the outer or grainward end of the platform, is of the greatest importance, since it is thereby possible to provide a clean, unencumbered space at the delivery end of the auger, so that the material delivered from the discharge end of the auger can effectively be picked up by the feeder conveyer by having the trough 71 located below the top run of the feeder conveyer and lifting the grain out of the trough by the end of the auger, in the manner described, onto the feeder. It is found that the feeder works most efficiently and the material is moved in an even stream in transferring it from the auger trough onto the conveyer without tangling the same or bunching it. It is significant, therefore, to note that, as viewed in Figure 7 for instance, the substantially horizontal top run of the front end of the feeder conveyer is disposed in a horizontal plane describing a line on a chord cutting across the discharge end face of the auger.

The manner of suspending the load of the platform directly from the thresher body and unifying with it the load of the feeder housing is also very advantageous in construction in permitting the machine to be constructed with a minimum of weight and without sacrificing the necessary strength.

The machine includes other novel features of construction that are highly desirable from the standpoint of reducing weight, such for example as utilizing the common shaft 107 for carrying the beater 108 within the feeder housing 56 and also using said shaft as the source of power for driving the auger conveyer from its outer or grainward end, as well as for taking off power to drive the reel.

It is intended to cover all changes and modifications of the illustrative embodiment of the invention herein disclosed which do not in material respects constitute departures from the spirit and scope of the invention as covered in the following claims.

What is claimed is:

1. In a harvester thresher having a longitudinal thresher part including structure defining a longitudinal feeder space in advance thereof and a harvester platform extending transversely of the thresher part and communicating with the feeder space, the combination with said platform of an auger conveyer, and means for supporting the conveyer over the platform with its discharge end terminating adjacent the grainward edge of the feeder space in a manner to leave the latter free and unencumbered where the platform and space communicate.

2. In a harvester thresher having a longitudinal thresher part including a longitudinal feeder housing in advance thereof and a harvester platform extending transversely from one side of the feeder housing, the combination with said platform of an auger conveyer located over the platform for delivering material to the feeder housing, and means for supporting the auger conveyer from its gainward end only.

3. In a harvester thresher having a longitudinal thresher part including a longitudinal feeder in advance thereof and a harvester platform extending transversely from one side of the feeder, the combination with said platform of an auger conveyer located over the platform and having its discharge end terminating adjacent the grainward edge of the feeder, and means for supporting the auger conveyer from its grainward end only.

4. In a harvester thresher having a longitudinal thresher part including a longitudinal feeder housing in advance thereof and a harvester platform extending transversely from one side of the feeder housing, the combination with said platform of an auger conveyer disposed over the platform and having its discharge end terminating adjacent the grainward edge of the feeder housing, means for supporting said conveyer, and a sickle disposed in advance of the auger and feeder housing.

5. In a harvester thresher having a longitudinal thresher part including a longitudinal feeder in advance thereof and a harvester platform extending transversely from one side of the feeder, the combination with said platform of an auger conveyer disposed over the platform and having its discharge end terminating short of the feeder, means for supporting said conveyer, and a sickle carried along the front edge of the platform, and being of a length equal substantially to the combined length of the auger plus the width of the feeder.

6. In a harvester thresher having a longitudinal thresher part including a longitudinal feeder in advance thereof and a harvester platform trough extending transversely from one side of the feeder with the bottom of the trough disposed at a lower level than the feeder, the combination with said platform of an auger conveyer disposed over the platform and having its discharge end terminating short of the feeder, and means for supporting the conveyer, the discharge end of the auger conveyer being so positioned with respect to the feeder as to cause it to elevate material from the bottom of said trough onto said feeder.

7. In a harvester thresher having a longitudinal thresher part including a longitudinal feeder in advance thereof and a harvester platform trough extending transversely from one side of the feeder with the bottom of the trough disposed at a lower level than the feeder, the combination with said platform of an auger conveyer including means to support same over the platform and having its discharge end terminating short of the feeder, and means carried by the discharge end of said auger for positively sweeping material from the end of the platform trough adjacent the feeder upwardly onto said feeder.

8. In a harvester thresher having a longitudinal thresher part including a longitudinal feeder in advance thereof and a harvester platform trough extending transversely from one side of the feeder with the bottom of the trough disposed at a lower level than the feeder, the combination with said platform of an auger conveyer including means to support same over the platform trough and having its discharge end terminating short of the feeder, the forward portion of said feeder having its top edge lying above the lower edge of the auger and disposed substantially horizontally on a line describing a chord of the auger.

9. In a harvester thresher having a longitudinal thresher part including a longitudinal feeder housing in advance thereof and a harvester platform extending transversely from one side of the feeder housing, the combination with said platform of an auger conveyer including a shaft including means to support the shaft and auger over the platform with both the auger and shaft terminating at the discharge end of the auger adjacent the grainward edge of the feeder housing.

10. In a harvester thresher having a longitudinal thresher part including a longitudinal feeder housing in advance thereof and a harvester platform extending transversely from one side of the feeder housing, the combination with said platform, of a shaft carried transversely over the platform, an auger conveyer carried on the shaft, both the shaft and auger conveyer at one end terminating short of the feeder housing, and means at the grainwood end of the platform for supporting said shaft, said latter means constituting the sole support for the shaft and auger conveyer whereby the discharge end of the auger conveyer where it transfers material into the feeder housing occupies a free and unencumbered space.

11. In a harvester thresher having a longitudinal thresher part including a longitudinal feeder in advance thereof and a harvester platform extending transversely from one side of the feeder, the combination with said platform of a shaft including means to carry same transversely over the platform, and an auger conveyer carried on said shaft over the platform and having its discharge end terminating short of the feeder.

12. In a harvester thresher having a longitudinal thresher part including a longitudinal feeder housing in advance thereof and a harvester platform extending transversely from one side of the feeder housing, the combination with said platform of a shaft including means to carry same transversely over the platform, an auger conveyer carried on said shaft over the platform and having its discharge end terminating adjacent the grainward edge of the feeder housing, said platform constituting a trough for the auger conveyer which trough has its bottom disposed below the floor of the feeder housing.

13. In a harvester thresher having a longitudinal thresher part including a longitudinal feeder in advance thereof and a harvester platform extending transversely from one side of the feeder, the combination with said platform of a shaft including means to carry same transversely over the platform, an auger conveyer carried on said shaft over the platform and having its discharge end terminating short of the feeder, said platform constituting a trough for the auger which trough at the discharge end of the auger terminates at the grainward edge of the feeder and is disposed below the top of said feeder to form a pocket, and means associated with the discharge end of the auger to sweep the material from said pocket onto the feeder.

14. In a harvester thresher having a longitudinal thresher part including a longitudinal feeder in advance thereof and a harvester platform trough extending transversely from one side of the feeder and closed by a wall at its grainward end, the combination with said platform of an auger conveyer supported over the platform trough and having its discharge end terminating short of the feeder, and means comprising the sole support for said auger conveyer and located at the wall end of the platform trough.

15. In a harvester thresher having a longitudinal thresher part including a longitudinal feeder in advance thereof and a harvester platform trough extending transversely from one side of the feeder and closed by a wall at its grainward end, the combination with said platform of an auger conveyer disposed transversely and over the platform trough and having its discharge end located adjacent the grainward edge of the feeder, and means for supporting said auger from the said wall only.

16. In a harvester thresher having a longitudinal thresher part including a longitudinal feeder housing in advance thereof and a harvester platform extending transversely from one side of the feeder housing, the combination with said platform of an auger conveyer located over the platform and having its discharge end terminating adjacent the grainward edge of the feeder housing, and means for torsionally supporting the auger conveyer from the grainward end only of the platform.

17. In a harvester thresher having a longitudinal thresher part including a longitudinal feeder housing in advance thereof and a harvester platform extending transversely from one side of the feeder housing, the combination with said platform of an auger conveyer located over the platform and having its discharge end terminating adjacent the grainward edge of the feeder housing, a pipe located transversely over the platform for carrying the auger conveyer, and means for supporting the pipe from the grainward end of the platform only.

18. In a harvester thresher having a longitudinal thresher part including a longitudinal feeder in advance thereof and a harvester platform extending transversely from one side of the feeder, the combination with said platform of an auger conveyer located over the platform and having its discharge end terminating substantially at the grainward edge of the feeder, a pipe located transversely over the platform for carrying the auger conveyer, and means for supporting the pipe, said pipe composed of sections of different diameters with the larger section at the grainward end and the smallest diameter section at the discharge end of the auger.

19. In a harvester thresher having a longitudinal thresher part including a longitudinal feeder housing in advance thereof and a harvester platform extending transversely from one side of the feeder housing, the combination with said platform of an auger conveyer including means to support same over the platform, said auger conveyer having its discharge end terminating in proximity to the grainward edge of the feeder housing, and means for driving the auger conveyer from the grainward end of the platform.

20. In a harvester thresher having a longitudinal thresher part including a longitudinal feeder in advance thereof and a harvester platform extending transversely from one side of the feeder, the combination with said platform of a support located over the platform, an auger conveyer including a hollow shaft carried on the support with the auger conveyer terminating at substantially the grainward edge of the feeder, and means for driving the auger conveyer and its hollow shaft from the grainward end of the platform.

21. In a harvester thresher having a longitudinal thresher part including a longitudinal feeder in advance thereof and a harvester platform extending transversely from one side of the feeder, the combination with said platform of an auger conveyer supported over the platform and having its discharge end terminating substantially at the grainward edge of the feeder, and a substantially horizontally disposed hairpin shaped member having its bight carried at the grainward end of the platform with one leg located over the platform and serving as the auger conveyer support.

22. In a harvester thresher having a longitudinal thresher part including means defining a feeder space in advance thereof and a harvester platform extending transversely from one side of the feeder space, the combination with said platform of an auger conveyer supported over the platform, and a U-shaped support carried by the platform including a leg extending over the platform to support the auger conveyer.

23. In a harvester thresher having a longitudinal thresher part including a longitudinal feeder in advance thereof and a harvester platform extending transversely from one side of the feeder, the combination with said platform of an auger conveyer supported over the platform, and a pair of substantially parallel pipes disposed substantially horizontally with the pipes cross-connected at their grainward ends, said pipe structure being carried by the platform and feeder with the forward pipe arranged over the platform and serving as the support for the auger conveyer.

24. In a harvester thresher having a thresher part, a longitudinal feeder housing in advance of said part, means connecting the housing to the thresher part for up and down movement about a horizontal axis, a platform trough extending transversely of the feeder housing and movable up or down therewith, said trough embodying a back upright wall and a grainward end wall, a substantially horizontally disposed support carried in the end wall and disposed over the trough forwardly of the back wall, and an auger conveyer mounted on the support and having its discharge end terminating substantially at the grainward edge of the feeder housing.

25. In a harvester thresher having a thresher part, a longitudinal feeder housing including a feeder, means connecting the housing to the thresher part for up and down movement about a horizontal axis, a platform trough extending transversely of the feeder housing and movable up or down therewith, said trough embodying a back upright wall and a grainward end wall, a substantially horizontally disposed support carried in the end wall and disposed over the trough, an auger conveyer mounted on the support and having its discharge end terminating short of the feeder, and a sickle arranged transversely in front of the platform and feeder and extending through the width of the combined length of the platform and width of the feeder.

26. In a harvester thresher having a thresher part, a longitudinal feeder housing including a feeder, means connecting the housing to the thresher part for up and down movement about a horizontal axis, a platform trough extending transversely of the feeder housing and movable up or down therewith, said trough embodying a back upright wall and a grainward end wall, a substantially horizontally disposed U-shaped support carried in the end wall with one leg disposed behind the back wall and the other leg disposed over the trough, and an auger conveyer carried on the latter leg of the support.

27. In a harvester thresher having a thresher part, a longitudinal feeder housing providing a feeder space, means connecting the housing to the thresher part for up and down movement about a horziontal axis, a platform trough extending transversely of the feeder housing and movable up or down therewith, said trough embodying a back upright wall and a grainward end wall, a substantially horizontally disposed U-shaped pipe structure carried in the end wall with one leg disposed behind the back wall and the other leg disposed over the trough, and an auger conveyer carried on the latter leg of the pipe, said auger conveyer having its discharge end terminating adjacent the grainward edge of the feeder space.

28. In a harvester thresher having a thresher part, a longitudinal feeder housing providing a feeder space, means connecting the housing to the thresher part for up and down movement about a horizontal axis, a platform trough extending transversely of the feeder housing and movable up or down therewith, said trough embodying a back upright wall and a grainward end wall, a substantially horizontally disposed pair of spaced pipes carried transversely in substantial parallelism, means connecting the grainward ends of the pipes, with one pipe located behind the back wall and the other pipe disposed over the trough, and an auger conveyer mounted on the latter pipe.

29. In a harvester thresher having a thresher part, a longitudinal feeder housing including a feeder, means connecting the housing to the thresher part for up and down movement about a horizontal axis, a platform trough extending transversely of the feeder housing and movable up or down therewith, said trough embodying a back upright wall and a grainward end wall, a substantially horizontally disposed U-shaped support carried in the end wall with one leg disposed behind the back wall and the other leg disposed over the trough, an auger conveyer mounted on the latter leg of the support over the platform trough, means detachably connecting the stubbleward end of the rear leg to the feeder housing, and a transverse axle and a pair of spaced wheels carrying the harvester thresher with the platform trough extended grainwardly of the grainward wheel, the platform trough embodying separably connected sections joined substantially along a longitudinal line with the grainward wheel whereby the grainward end section may be removed to narrow the harvester thresher.

30. In a harvester thresher having a thresher part, a longitudinal feeder housing connected to and disposed in advance of the thresher part, a platform trough extending transversely of the feeder housing, said trough embodying a substantially upright back wall and a grainward end wall, a substantially horizontally disposed support carried in the end wall and disposed over the trough, an auger conveyer mounted on the support, a horizontal baffle carried on the front face of the back wall and extending forwardly and downwardly toward the upper edge of the auger conveyer, and a reinforcing strip located below the baffle and connected between the back-board and baffle, said strip throughout its length being uniformly curved in cross section.

31. In a harvester thresher having a thresher part, a longitudinal feeder housing connected to and disposed in advance of the thresher part, a platform trough extending transversely of the feeder housing, said trough embodying a substantially upright back wall and a grainward end wall, a substantially horizontally disposed support carried in the end wall and disposed over the trough, an auger conveyer mounted on the support, a substantially horizontal baffle carried on the front face of the back wall and extending forwardly and downwardly toward the upper edge of the auger conveyer, and a reenforcing strip located below the baffle and connected between the back-board and baffle, said strip being curved in cross section, said baffle and strip being spaced at its grainward end a substantial distance from the end wall and at its other end extending substantially to the feeder housing.

32. In a harvester thresher having a thresher part, a longitudinal feeder housing connected to and disposed in advance of the thresher part, a platform trough extending transversely of the feeder housing and connected thereto, said trough embodying a back upright wall and a grainward end wall, a substantially horizontally disposed support carried in the end wall and disposed over the trough, an auger conveyer mounted on the support, a transverse shaft carried in the feeder housing and extending along the back side of the upright wall, and means for driving the auger conveyer from the grainward end of said shaft.

33. In a harvester thresher having a thresher part, a longitudinal feeder housing including a feeder connected to and disposed in advance of the thresher part, a platform trough extending transversely of the feeder housing, said trough embodying a back upright wall and a grainward end wall, a substantially horizontally disposed support carried in the end wall and disposed over the trough, an auger conveyer mounted on the support, a transverse shaft carried in the feeder housing and extending along the back side of the upright wall, a beater on said shaft over the feeder within the feeder housing, means for driving said shaft, and means for driving the auger conveyer from said shaft.

34. In a harvester thresher having a thresher part, a longitudinal feeder housing connected to and disposed in advance of the thresher part, a platform trough extending transversely of the feeder housing and connected thereto, said trough embodying a back upright wall and a grainward end wall, a substantially horizontally disposed support carried in the end wall and disposed over the trough, an auger conveyer mounted on the support, a reel carried by the platform over the auger conveyer in a position forwardly thereof, a transverse shaft carried by the feeder housing and located behind the upright wall, means for driving the said shaft, means for driving the auger conveyer from said shaft, and means for driving the reel from said shaft.

35. In a harvester thresher having a thresher part, a longitudinal feeder housing including a feeder connected to and disposed in advance of the thresher part, a platform trough extending transversely of the feeder housing and connected thereto, said trough embodying a back upright wall and a grainward end wall, a substantially horizontally disposed support carried by the end wall and disposed over the trough, an auger conveyer mounted on the support, a shaft carried in the feeder housing and extending along the back side of the upright wall, a beater over the feeder on said shaft within the feeder housing, a reel carried by the platform, means to drive said shaft to turn the beater, and means to drive the reel and auger conveyer from said shaft.

36. In a harvester thresher, a transverse wheel carried axle, a thresher body carried on said axle, a longitudinal feeder housing disposed in advance of the body, means connecting the housing to the body for up and down movement about a transverse horizontal axis, a harvester platform extending transversely from the feeder housing and connected thereto for up and down movement therewith a trussed frame carried from the body and extending forwardly and grainwardly therefrom, a line lever structure, means for hinging same on a horizontal axis to said frame for carrying the platform, and means for counterbalancing the weight of the platform and feeder housing.

37. In a harvester thresher, a transverse wheel carried axle, a thresher body carried on said axle, a longitudinal feeder housing disposed in advance of the body, means connecting the housing to the body for up and down movement about a transverse horizontal axis, a harvester platform extending transversely from the feeder housing and connected thereto for up and down movement therewith, a trussed frame carried from the body and extending forwardly and grainwardly therefrom, a line lever structure including a bail having an X-brace, said structure including means hinged on a horizontal axis to said frame for carrying the platform, said axis being coincident with the aforementioned axis, and means for counterbalancing the weight of the platform and feeder housing.

38. In a harvester thresher, a transverse wheel carried axle, a thresher body carried on said axle, a longitudinal feeder housing disposed in advance of the body, means connecting the housing to the body for up and down movement about a transverse horizontal axis, a harvester platform extending transversely from the feeder housing and connected thereto for up and down movement therewith, a trussed frame carried from the body and extending forwardly and grainwardly therefrom, a line lever structure, means for hinging said structure on a horizontal axis to said frame for carrying the platform, a standard supported by the trussed frame, a rockable element carried on the standard, said standard located between the axle and platform, and a spring counterbalance including a flexible element trained over the rockable element and connected to the line lever structure for springing the weight of the feeder housing and platform.

39. In a harvester thresher, a transverse wheel carried axle, a thresher body carried on said axle, a longitudinal feeder housing disposed in advance of the body and connected thereto, a harvester platform extending transversely from the feeder housing and connected thereto, a trussed frame including means carrying same from the body and extending forwardly and grainwardly therefrom, a line lever structure, means to hinge same on a horizontal axis to said frame for carrying the platform, means for counterbalancing the weight of the platform, and a draw-frame connected to the body and axle and extending forwardly from the stubbleward side of the body alongside the feeder housing.

40. In a harvester thresher, a transverse wheel carried axle, a thresher body carried on said axle, a longitudinal feeder housing disposed in advance of the body and connected thereto for up and down movement about a transverse horizontal axis, a harvester platform extending transversely from the feeder housing and connected thereto for up and down movement therewith, a trussed frame including means carrying same from the body and extending forwardly and grainwardly therefrom, a line lever structure, means to hinge said structure on a horizontal axis to said frame for carrying the platform, means for counterbalancing the weight of the platform and feeder housing, and a trussed draw-frame extending from the axle forwardly along the stubbleward side of the feeder, said draw-frame including a bar connected to the top of the thresher body.

41. In a harvester thresher, a transverse wheel carried axle, a thresher body carried on said axle, a longitudinal feeder housing disposed in advance of the body and connected thereto, a harvester platform extending transversely from the feeder housing and connected thereto, a line lever structure, means to hinge same from the body on a horizontal axis for carrying the platform, means for counterbalancing the weight of the platform, and a draw-frame at the stubbleward side of the feeder housing including a bar connected to the axle and a truss-bar connected to the top of the thresher body.

42. In a harvester thresher, a transverse wheel carried axle, a thresher body carried on said axle, a longitudinal feeder housing in advance of the body and connected thereto, a harvester platform extending transversely from the feeder housing and connected thereto, a line lever structure, means to hinge same from the body on a horizontal axis for carrying the platform, means for counterbalancing the weight of the platform, a draw-frame at the stubbleward side of the feeder housing comprising a pair of substantially horizontally disposed converging draw-bars connected at spaced points with the axle, an operator's deck carried on said draw-bars including control means for raising and lowering the platform, and a truss-bar for the draw-frame connected between the top of the thresher body and the point of convergence of the draw-bars.

43. In combination, a harvester thresher comprising a thresher part including a thresher cylinder turnable about a transverse axis, a longitudinal endless feeder conveyer disposed in advance of the cylinder and operable to feed material thereto, a sickle disposed transversely in front of the forward end of the feeder conveyer, and an auger conveyer including means to support same from one end only and turnable about a transverse axis behind the knife to receive crop material and feed it into the side of the feeder conveyer, the auger conveyer and feeder conveyer cooperating to move cut crop material into said cylinder.

44. In combination, a harvester thresher comprising a transverse knife, a thresher cylinder, a crop gathering mechanism behind the knife including means to feed cut material to the cylinder, a transverse auger conveyer included in the gathering mechanism and cooperating with the first means to feed material toward the cylinder, and means for supporting the auger conveyer from one end only to leave its discharge end free.

45. In a harvester thresher, a longitudinal thresher body, means laterally spaced from the body providing a location to receive grain to be discharged from the body, an upright grain discharge elevator having sides disposed between said means and body, and a drive chain for said elevator carried thereby on a side thereof facing the thresher body and opposite from the side facing the said means providing said location.

46. In a harvester thresher having a thresher part constructed to form a cut crop feeding path extending in one direction and a harvester platform extending at an angle to said thresher part and communicating with said cut crop feeding path, the combination with said platform of an auger conveyer associated with said platform and having its discharge end terminating adjacent the grainward edge of said cut crop feeding path to leave the latter free and unobstructed for a free movement of the cut crop.

47. In a combined harvester thresher having harvester and thresher parts each constructed to form a cut crop feeding path, said paths being communicating and relatively angularly disposed, a supported auger conveyer associated with said harvester cut crop feeding path and having its discharge end terminating adjacent the proximate edge of said thresher cut crop feeding path to permit a free unobstructed movement of the cut crop where the angle of the path of movement of said cut crop changes.

48. In a combined harvester thresher having harvester and thresher parts each constructed to form a cut crop feeding path, said paths being communicating and relatively angularly disposed, a supported auger conveyer associated with said harvester cut crop feeding path and having its discharge end terminating adjacent the proximate edge of said thresher cut crop feeding path to permit a free unobstructed movement of the cut crop where the angle of the path of movement of said cut crop changes, and means for supporting said auger conveyer whereby the discharge end thereof is freely suspended.

49. In a harvester having a body, crop gathering mechanism including an auger conveyer, a feeder conveyer, the two conveyers being angularly related cooperatively to feed gathered crop material to said body, and means for supporting the auger conveyer from one end only with the discharge end thereof being freely suspended and offering no obstruction to a free movement of the material.

ALEXUS C. LINDGREN.
CLEMMA R. RANEY.